United States Patent
Fountain et al.

(10) Patent No.: US 6,319,389 B1
(45) Date of Patent: Nov. 20, 2001

(54) RECOVERY OF COPPER VALUES FROM COPPER ORES

(75) Inventors: Gearld F. Fountain, Globe; Joseph M. Keane, Sahuarita, both of AZ (US)

(73) Assignee: Hydromet Systems, L.L.C., Tucson, AZ (US)

( * ) Notice: Subject to any disclaimer, the term of this patent is extended or adjusted under 35 U.S.C. 154(b) by 0 days.

(21) Appl. No.: 09/448,917

(22) Filed: Nov. 24, 1999

(51) Int. Cl.$^7$ ............................. C25D 3/04; C22B 15/00
(52) U.S. Cl. ............................................. 205/583; 75/731
(58) Field of Search .................................. 205/581, 583; 75/731

(56) References Cited

U.S. PATENT DOCUMENTS

| | | | |
|---|---|---|---|
| 4,115,221 | 9/1978 | Wadsworth et al. | 204/108 |
| 4,120,935 | 10/1978 | Fountain et al. | 423/41 |
| 5,527,382 | 6/1996 | Pincheira Alvarez | 75/712 |
| 5,917,116 | 6/1999 | Johnson et al. | 75/710 |

FOREIGN PATENT DOCUMENTS

| | | |
|---|---|---|
| 1156050 | 11/1983 | (CA) . |
| 2215963 | 9/1996 | (CA) . |

*Primary Examiner*—Donald R. Valentine
(74) *Attorney, Agent, or Firm*—Ware, Fressola, Van Der Sluys & Adolphson LLP

(57) ABSTRACT

Copper values are efficiently recovered from a copper ore, including secondary sulfides, by first crushing the ore to a particle size P-80 of about 1 to 2 inches, then grinding the so crushed ore to a particle size P-80 of between Tyler 4 mesh and 20 mesh, and then classifying the ground ore into a fines fraction of less than 65 mesh and one or more coarse fractions of more than 65 mesh. The fines are then leached or subjected to flotation to form a concentrate which is leached to form a pregnant leach solution. In parallel, the coarse fraction or fractions are leached also to form a pregnant leach solution. The leaching operations are carried out with ferric sulfate lixiviant at atmospheric pressure and elevated temperature. During leaching ferric sulfate is reduced to ferrous sulfate. The pregnant leach solutions are then subjected to solvent extraction to recover the copper values and subsequently to electrowinning to produce copper metal. During the solvent extraction operation, free sulfuric acid is produced and is then used together with oxygen to oxidize the ferrous sulfate produced during the leaching steps back to ferric sulfate with is then re-used in the leaching of the fines and coarse fractions.

19 Claims, 8 Drawing Sheets

RECOVERY OF COPPER VALUES FROM COPPER ORES

BACKGROUND OF THE INVENTION

1. Field of the Invention

The present invention relates to the treatment of ores containing leachable metal values. More specifically, this invention relates to the recovery of copper values from copper ores, and is particularly applicable to leaching of secondary copper sulfides from any copper sulfide deposit and extraction of copper therefrom. In a preferred embodiment, the invention relates to a hydrometallurgical treatment of sulfide minerals found in porphyry ore deposits, which are generally difficult to leach in an efficient and economical manner.

2. Description of the Prior Art

In treating copper bearing ores, materials containing primary or secondary sulfides have typically been processed using the conventional milling/flotation process which includes crushing, grinding and flotation, followed by smelting and refining of the concentrate. Copper oxide minerals are not easily floated and these ores have generally been processed hydrometallurgically by sulfuric acid leaching in slurry, vat or heap leaching processes. In recent years, bio-heap hydrometallurgical processing of secondary sulfides ores using a ferric sulfate lixiviant has gained some favor. Research has also been intense in recent years on leaching of copper sulfide concentrates, including chalcopyrite concentrates, using slurry bio-leaching, atmospheric leaching of ultra-fine ground concentrates and processes involving pressure leaching at elevated temperatures.

Conventional milling/flotation typically requires a particle size reduction to less than 150 mesh (0.105 millimeters) to achieve mineral liberation from the gangue and to permit high rougher flotation copper recovery. Regrinding of the rougher concentrate produced to as fine as minus 400 mesh (0.037 millimeters) may then be necessary to allow mineral liberation sufficient to achieve an economic concentrate grade. The concentrate produced must then be further processed by smelting and refining or a hydrometallurgical process to finally obtain cathode copper. The conventional milling/flotation process is mineralogy dependent, and is energy, capital and operating cost intensive, as are the subsequent smelting and refining steps, requiring a higher ore grade to justify project economics.

Hydrometallurgical leaching processes for ores of copper oxides, secondary sulfides and dump leaching of chalcopyrite waste materials have typically included in situ leaching, dump leaching, heap leaching, vat leaching and agitation slurry leaching.

In situ leaching processes involve in-place leaching of material in a deposit. Porosity for solution permeability is required either naturally, by high pressure, hyro-fracturing, or by blasting. Rubble zones or caved areas from old underground mines are also suitable for in-situ or in-place leaching. Solution is distributed on the surface or injected through drill holes in the deposit, percolates or is forced by pressure through the ore zone, solubilizing the metal values. The leach solutions are collected by underground workings or drill wells for recovery of the metal values therefrom. Typically, recovery of metal values requires years and only reaches leach recoveries of 40 to 60 percent.

Dump leaching is typically applied to leaching of the massive run of mine tonnages of mineralized, but below ore cutoff grade waste, generated from copper porphyry deposit mine operations. Dump leaching can be used to recover copper from materials containing oxide and sulfide mineralization and utilizes bio-leaching techniques. Recoveries are typically less than 50 percent after 10 to 25 years of leaching. Leach kinetics are very slow and solution copper contents are very low.

Heap leaching is applied for leaching of oxidized copper ores, secondary copper sulfides, uranium and precious metal ores. Typically the ores are crushed to less than one inch (25 millimeters) and to as fine as minus ¼ inch (6.3 millimeters). Leaching can be performed in permanent heaps where successive lifts are placed over the original lift or in a reusable pad which allows the ore to be leached in one lift, the leach residue and a new lift placed on the pad. Recoveries are generally 65 to 85 percent, depending or the ore being leached, and leach cycle times range from months to a year. Heap leaching has been used more recently for bio-leaching of secondary copper sulfide ores such as with the operations of Quebrada Blanca and Cerro Colorado in Chile and Cerro Verde in Peru. Cyprus Miami in Arizona, USA, and other US producers also employ a ferric leach or ferric cure technology for run of mine mixed oxide and secondary sulfide copper ores. Heap leaching technology allows processing of higher grade ores, but is typically used on lower grade ores (less than 1% copper) due to comparatively low capital and operating costs versus conventional technology.

Heap leaching of secondary copper sulfides of chalcocite and covellite is a viable but challenging hydrometallurgical process. The dedicated secondary sulfide leaching facilities started up over the past few years have generally experienced lower recoveries, slower leach kinetics and higher operating costs than predicted from test work. The major difficulty has been oxygen availability internally within the heap sufficient to promote bacterial activity for direct leaching of sulfides and/or the oxidation of ferrous sulfate to ferric sulfate, the primary lixiviant for the process. Many techniques from fine crushing to drum agglomeration, various lift heights, various flow rates and flow regimes and forced aeration have been employed to enhance the process. The end result remains that this technology has distinct limitations and disadvantages.

Slurry agitated leaching has been used primarily on oxidized copper ores. It can also be used for bio-leaching of copper sulfide concentrates. Slurry leaching requires fine grinding and continuous agitation which results in high power consumption and is typically applied to higher grade ores or concentrates.

Vat leaching has typically been used for processing of copper oxide ores and those ores with higher copper grades.

Although the present invention is equally effective on any leachable copper containing ore, it is particularly effective on leaching of the lower grade secondary sulfide copper ores commonly found in porphyry copper deposits.

It is well known that the bulk of the world copper resources are contained in porphyry copper deposits. Porphyry deposits originate as intrusions of protore, generally with chalcopyrite mineralization. When rock porosity is present to allow downward flow of meteoric water, and provided sufficient pyrite is present to produce oxidizing acids, surface minerals are dissolved and transported downward to areas where solutions become more basic and reducing, generally below the water table, and are reprecipitated. Thus, there are typically three copper mineralized zones in classical porphyry deposit, the oxidized zone, the supergene zone (which is generally the highest grade zone in the deposit that contains secondary sulfide minerals) and the hypogene zone or protore zone which is presumably the original source of all the copper in the deposit.

Thus, a classical description of a porphyry copper deposit includes a relatively copper barren oxidized capping over the deposit; lying beneath this capping is a zone of oxidized copper mineralization (oxide copper ore); beneath this zone is a zone of enriched secondary sulfides; and beneath the secondary sulfides zone lies the zone of primary sulfides or protore from which the deposit was generated.

Porphyry deposits can deviate from the classical model due to age of the deposit, mineralization, ground water table variations over time, erosion, climatic conditions, etc. Thus, deposits can have little to no oxide capping or a large oxidized capping zone, and little or no secondary sulfide enrichment or large enrichment zones. The majority of the in ground copper resources worldwide are contained in primary ore zones as chalcopyrite (70%). However, substantial resources are also contained in secondary sulfide mineral zones and in oxide zones. For example, in Morenci, Ariz. or in El Salvador, Chile, the economic value of such deposits is due to supergene enrichment. The lower grade secondary sulfide ores generally found in porphyry copper deposits range from 0.5% to 1.5% copper contained in chalcocite and covellite mineralization.

Oxide ores are generally contained in the rock as fracture filled mineralization and most copper values are contained as chrysocolla, malachite, azurite and atacamite. There are numerous other minor oxide minerals present in such deposits. Oxide minerals are normally easily leachable simply by leaching with sulphuric acid. Leach kinetic rates are rapid leading to effective recoveries.

Secondary sulfide ores are generally contained as fracture filled mineralization in the rock fractures, but usually include some dissemination of the minerals in the host rock. The bulk of secondary sulfide minerals occur as chalcocite, but can also have significant quantities of covellite, some bornite and some deposits can contain quantities of enargite. There are also minor amounts of other sulfide minerals.

Secondary sulfide minerals are not efficiently leached with sulfuric acid, but can be leached efficiently under oxidizing conditions using lixiviants such as ferric sulfates or chlorides. Chalcocite ($Cu_2S$) leaching with ferric sulfate proceeds in two stages. The first stage leaching involves dissolution of one of the copper molecules from the $Cu_2S$, leaving CuS or what is termed synthetic covellite. The first stage leaching is relatively temperature insensitive and has very rapid kinetics. The second stage leaching of the synthetic covellite solubilizes the remaining copper, leaving the sulfur in elemental sulfur form. This stage of leaching can have an order of magnitude slower leaching kinetics, is very temperature dependent and is also dependent on ferric concentration. However, leaching rates are still commercially acceptable since the synthetic covellite resulting from the chalcocite leaching has a relatively porous structure. Naturally occurring covellite, not uncommon in porphyry deposits, is significantly more difficult to leach than synthetic covellite. Bornite minerals are leachable in ferric sulfate with kinetics similar to synthetic covellite, while enargite can be slightly to totally refractory to leaching.

Primary sulfides are generally contained within fracture filled mineralization, but increasing amounts are disseminated within the host rock. The mineralization is mostly chalcopyrite. Leaching of the primary chalcopyrite is especially difficult in both ferric sulfate and chloride at ambient temperature and pressure. Leachability increases with increasing temperature, stronger oxidants, and pressure above atmospheric. At the present time, there is no commercial heap leaching process for chalcopyrite ore that provides a mine with a leach scenario such as with secondary sulfides. Leach kinetics are several orders of magnitude slower than with secondary sulfides.

Typically, with all mineral leaching, recovery and leach kinetics increase with decreasing particle size. Thus, for example, in U.S. Pat. No. 4,115,221 there is described a process for ferric sulfate leaching of copper sulfide-bearing materials which requires fine-grinding such materials to a particle size of at most one micron, prior to leaching. In U.S. Pat. No. 5,917,116 the copper mineral is milled to the particle size P-80 of between 2 and 20 microns and then subjected to oxidative leaching in the presence of chloride ions. In Canadian Patent No. 1,156,050 a process is disclosed for recovering copper from chalcopyrite in which the material is first ground to a particle size of 1.5–5 microns and then divided into two streams each of which is subjected to a particular hydrometallurgical treatment. Also, in published Canadian Patent Application No. 2,215,963 an atmospheric mineral leaching process is disclosed in which a sulfide mineral composition is first milled to a particle size P-80 of 20 microns or less before leaching with a solution comprising sulfuric acid and ferric ions.

It is also known to extract copper values from ores by dump leaching or pile leaching where the dump or pile of the ore is wetted with sulfuric acid to sulfatize the same and extract copper. An example of such dump leaching is disclosed in U.S. Pat. No. 4,120,935 which has one of the inventors common to one of the inventors in the present application. A similar pile leaching is disclosed in U.S. Pat. No. 5,527,382 where the ore is classified into coarse and fine fractions, with the coarse fraction being subjected to pile leaching and the fine fraction to pile curing followed by repulping under pressure, filtering and washing. Then, the raffinate from both fractions is subjected to solvent extraction and electrowinning. Despite the fact that such processes have achieved some saving in the time period required to leach the dump or pile, the sulfatization still requires several days or even weeks to achieve satisfactory recoveries and, in fact, the use of sulfuric acid alone may not be at all satisfactory for treatment of secondary sulfide minerals containing chalcocite and covellite.

OBJECTS AND SUMMARY OF THE INVENTION

It is an object of the present invention to provide a novel process for recovery of copper values from copper containing ores and particularly from secondary sulfides, such as chalcocite and covellite, which process would obviate the disadvantages of known processes and reduce leach times to 48 hours or less, facilitate materials handling and reduce capital and operating costs.

Another object of the invention is to minimize crushing/comminution costs and the fines generated during the process, while achieving high recoveries of copper, usually above 95% for chalcocite and over 85% for covellite.

A further object is to provide a process that is much more environmentally friendly than currently used processing, such as dump leaching, pile leaching and bio-heap leaching where flow of acid into the environment is difficult to control.

Other objects and advantages of the invention will be apparent from the following description thereof.

It has been established by the present applicants that size reduction provided by multi-stage crushing for heap leaching is inadequate to obtain high recoveries and rapid leach kinetics and that fine grinding for flotation processes results in substantial and unnecessary overgrinding. Grinding power consumption in KWH per tonne of ore increases rapidly when grinding to less than a P-80 of 10–20 mesh (1.68 mm–0.84 mm). Thus, the very fine grinding required in the above mentioned prior art patents renders such processes uneconomical particularly on lower grade copper ore. Multi-stage crushing not only provides insufficient size reduction in conventional heap leaching practices, but produces excess fines which negatively impact recoveries and leach kinetics. In contrast to the above, the present applicants use within the novel hydrometallurgical technology of the present invention a size reduction only to mineral liberation to a leach solution, typically between a P-80 of 4 and 20 mesh (4.76 to 0.84 millimeters). Such ore can then be treated at atmospheric pressure and elevated temperature using a ferric sulfate lixiviant, to obtain high copper recoveries, typically 85–95% within a short period of time, namely 8 to 48 hours. The novel process promotes ease in handling of the sized ore products and eliminates the problems associates with slimes, fines and clays. The process also obviates the requirement for bacterial oxidation of ferrous iron and easily maintains a material and solution balance within the unit operations.

In essence, the novel process for the recovery of copper values from copper ores, which may contain secondary sulfides such as chalcocite and covellite, comprises:

(a) crushing the copper ore to a predetermined particle size greater than ½ inch (12.6 mm), preferably to a P-80 of between 1 and 2 inches;

(b) comminuting the crushed ore to a particle size which allows mineral liberation to leach solution, usually to a P-80 of between 4 and 20 mesh (4.76 to 0.84 millimetres) depending on the characteristics of the ore being treated;

(c) classifying the comminuted ore into a fines fraction and at least one coarse fraction, the fines fraction preferably having a P-80 of less than 65 mesh (0.21 mm);

(d) leaching the fines fraction with a ferric sulfate lixiviant, preferably at a ferric sulfate concentration of between 5 and 30 g/l, at atmospheric pressure and a temperature of between about 50 and 80° C., preferably between 60 and 80° C., so as to generate a copper pregnant leach solution (PLS) while ferric sulfate is reduced to ferrous sulfate; or (e) subjecting the fines fraction to flotation to produce a concentrate and leaching the concentrate with a ferric sulfate lixiviant, preferably at a ferric sulfate concentration of between 5 and 30 g/l, at atmospheric pressure and a temperature between about 50° C. and 80° C., preferably between 60° C. and 70° C., so as to generate a copper pregnant leach solution (PLS), while reducing the ferric sulfate to ferrous sulfate;

(f) in parallel to the leaching of steps (d) or (e), leaching the coarse fraction or fractions with ferric sulfate lixiviant at atmospheric pressure and a temperature between about 50° C. and 80° C. so as to form a copper PLS, while the ferric sulfate lixiviant is reduced to ferrous sulfate;

(g) oxidizing the ferrous sulfate produced in steps (d) or (e) and (f) to ferric sulfate in a separate ferric sulfate regeneration step using sulfuric acid and oxygen at temperatures between 50 and 80° C. and pressures between about 3 and 10 atmospheres and re-using the regenerated ferric sulfate in steps (d) or (e) and (f);

(h) extracting copper values from the pregnant leach solutions of steps (d) or (e) and (f) by solvent extraction while generating, during this SX step, free sulfuric acid as a result of copper being extracted by an organic SX reagent;

(i) re-using the free sulfuric acid produced in step (h) in the ferric sulfate regeneration step (g); and finally (j) the copper values extracted in step (h) can be converted to copper metal by electrowinning.

It should be noted that the crushing and comminution steps (a) and (b) are preferably carried out in a manner such as to minimize the amount of fines thereby produced. Fines naturally occurring in the ore, or fines generated during size reduction, will ultimately increase operating problems and costs at some stage of the hydrometallurgical process. Minimizing the quantity of fines in this process is accomplished by removing the natural fines contained in the ore as soon in the crushing/comminution process as possible and removing fines generated in the comminution process as they are generated. In the comminution step (b), depending on the mineral liberation requirements of the ore being comminuted, the particle size is usually anywhere between a P-80 of 4 mesh (4.76 mm), and a P-80 of 20 mesh (0.84 mm), with a P-80 of 10 mesh (1.68 mm) normally being sufficient. The objective is to only grind to mineral liberation to leach solution, minimizing comminution costs and maintaining the maximum possible tonnage in the plus 65 mesh (0.21 mm) coarse fraction or fractions. When reference is made in this application to P-80, it means that 80% of the material passes the size, and when made to "mesh", it refers to the Tyler sieve mesh size.

In step (c), the classification may lead to more than one fraction of the coarse material to optimize leach time requirements for each fraction. For example two or three coarse fractions may be produced, but only one fraction of fines which, for the purposes of the present invention, are preferably considered to have a P-80 particle size of 65 mesh (0.21 millimeters). Depending on the type of ore treated and other conditions, this boundary between the fines and the coarse material may be modified or adjusted, but the particle size distribution of the fines in accordance with the present invention is still much coarser than those mentioned in some of the prior patents discussed above where it must generally be between 1 and 20 microns or less, while the coarse ore fraction or fractions herein are substantially finer than those used in conventional heap leaching. Most of the fines are naturally occurring in the ore, but some are produced in steps (a) and (b). Separation of the fines from the coarse particles may be carried out, for instance, in a hydraulic classifier, screens or cyclones.

The entire fines fraction can be directly slurry leached as set out in step (d), particularly when the ore contains significant quantities of oxide minerals which are not readily floatable, or when high flotation recoveries cannot be achieved. When this occurs, the liquid/solids separation requirements and the operating costs may increase. Thus, when possible, it is preferable to subject the fines fraction to flotation in order to produce a concentrate and then leach the concentrate as indicated in step (e) above.

When the fines are subjected to flotation in step (e), this is done by adjusting a fines slurry from the classifier to a desired percent solids for flotation, for instance in a thickener, and feeding the same to a bank of rougher flotation cells which would normally be optimized to obtain maximum flotation recoveries, typically above 95%. Besides concentrating the copper values in the fines fraction into a small tonnage which simplifies the leaching process, flotation also allows discarding of the non-mineralized tailings and removal of the natural fines and clays from the process prior to leaching, thereby facilitating the leaching process and particularly the liquid/solids separation. Depending on the ore and mineralogy, a cleaner stage may also be appropriate. Generally, a rougher concentrate will produce a concentrate grade of between 5 and 10% copper, which is adequate for this process.

Prior to leaching of the concentrate or the total fines fraction, a de-watering step is preferable. This can be performed in one of several filtration devices including vacuum drum filters, vacuum belt filters or various types of plate and frame filters. The process tonnage rate may determine equipment selection. The de-watering step provides the ability to maintain a close water balance in the leach circuit.

Since the tonnage of the fines fraction from the ore is small, 20 to 30%, and particularly if flotation is used, leaching of the concentrate in step (e), or of the complete fines fraction in step (d), may be carried out in relatively small multi-stage co-current agitated leach tank reactors to obviate problems with short circuiting. Depending on recovery desired, particle size, leach temperature, iron concentration and net acid generation or consumption, it may take from about 8 to 16 hours to complete the leaching operation, depending on mineralogy. The leach tank reactors are preferably insulated and heat exchangers may be utilized to facilitate heat balances in the leach circuit. Following liquid/solid separation of the leached tailings, copper recovery of 85 to 95% is typically obtained, depending on mineralogy. A high PLS grade of between 5 and 15 g/l is normally obtained.

The leaching of the coarse ore in step (f) can be done after subdividing the coarse particles, for instance to a particle size distribution between 4 mesh (4.76 mm) and 65 mesh (0.21 mm), or preferably after subdividing the coarse particles into several leach products of different size distributions and providing different times and leach reactor sizes for each product. A double or triple deck screen easily allows de-watering and segregation of the coarse particles into such different products. The leaching of each product may be carried out on a batch basis in a single tank reactor or a number of parallel tank reactors or preferably in a continuous multi-stage countercurrent reactor system. Also, a conventional vat leach system may be used with countercurrent solution flow. As in the case of concentrate leaching, the coarse leach reactors are preferably insulated and heat exchangers may be provided so as to obtain maximum self sufficiency in heat requirements. The required leach time is normally 24 to 48 hours, depending on mineralogy, particle size distribution and temperature. Recoveries are generally between 85% and 95%, depending on mineralogy. Again, a high PLS grade (5 to 15 g/l) is typically obtained.

Also, it should be noted that as a result of the size distribution with a P-80 of approximately 10 mesh (1.68 millimeters), which is a preferred embodiment of the present invention, and with the fines fraction of minus 65 mesh (0.21 millimeters) removed, the leaching and handling of the coarse fraction is much facilitated compared with conventional leaching technology. Leach flow rates through the reactor may be maintained as desired to as low as 0.005 gallons per minute per square foot in the reactor or up to and including a flow rate that allows fluidization of the ore bed, typically less than 2.0 gallons per minute per square foot in the reactor. Therefore, on a batch basis, the reactor can be charged as a pumped slurry, and following leaching on a batch basis, the tailings can be fluidized and discharged as a slurry, greatly simplifying coarse material handling. With essentially no fines or clays present, upward solution percolation through the sized, but fines free ore, is extremely efficient.

It should further be noted that because of the relatively tight size distribution variation of the sized ore used in this invention, the reactors can also be constructed to allow a multi-stage continuous countercurrent flow leach system. A countercurrent flowsheet provides the most effective utilization of ferric iron and control of temperature in the process. For example, fresh ore containing chalcocite is easily leached at lower ferric concentrations and ferric to ferrous ratios and lower oxidation/reduction potential (ORP) and lower temperature. Ore in the last leach reactor stages, which may primarily contain covellite, is leached at the highest ferric content and ferric to ferrous ratios allowing high ORP at the desired temperature. Since the majority of the copper recovery, particularly with chalcocite, occurs within 4 to 8 hours, the PLS ferric iron concentration in the first leach stage can be allowed to fall to lower levels, which allows more efficient SX operations relative to iron extraction.

Continuous reactors also allow ease of handling of the ore solids. Continuous material flow can be accomplished by charging the ore in a slurry with raffinate to a single reactor. Intermittent, or continuous fluidization, if desired, provides efficient movement and separation of the ore and solution to allow a continuous countercurrent movement of the solution and solids through multiple reactors. Separation of the leach solution and solids can easily be accomplished by hydraulic classifiers, screening, pumps, augers or other methods from stage to stage. The leach reactor configuration can be square, rectangular or round but all configurations are preferably enclosed vessels for control of leach conditions and temperature. The leached tailings, free of fines and slimes, can easily be processed with a belt filter to allow efficient recovery of mother liquor by counter current washing and to permit a final pH adjustment in the final wash stage to allow discharge of an environmentally friendly tailings. Belt filtration also allows heat recovery from the ore and preserves the water balance around the leaching circuit.

When treating ores containing chalcocite, the chalcocite leaching reaction with ferric sulfate is generally known to be occurring in two stages as follows:

$$Cu_2S + Fe_2(SO_4)_3 \rightarrow CuSO_4 + CuS + 2\ FeSO_4 \text{ (chalcocite first stage leaching)}$$

$$CuS + Fe_2(SO_4)_2 \rightarrow CuSO_4 + 2\ FeSO_4 + S° \text{(covellite second stage leaching of chalcocite)}$$

$$Cu_2S + 2\ Fe_2(SO_4)_3 \rightarrow 2\ CuSO_4 + 4\ FeSO_4 + S° \text{(combined first and second stage) leach)}$$

The reaction requires 1.76 g of $Fe^{+++}$ per gram of Cu dissolved.

The first stage chalcocite leaching reaction is essentially indifferent to temperature and leach kinetics are very rapid. The second stage leaching of chalcocite, or leaching of the synthetic covellite remaining from the first stage leach reaction, is considerably more difficult. At ambient temperature, the recovery and reaction kinetics can be an order of magnitude slower than the first stage leaching of chalcocite. However, leach kinetics are very particle size and temperature sensitive and leach kinetics approach first stage kinetics at approximately 60 to 70° C. provided mineral liberation to leach solution is achieved. Naturally occurring covellite in the ore is typically even more difficult to leach than the synthetic covellite generated from chalcocite leaching. Within the embodiment of this invention, the aggressive leach parameters allow rapid recovery of all chalcocite, synthetic and naturally occurring covellite and bornite. Additionally, significant recovery occurs from chalcopyrite. The ratio of ferric to ferrous sulfate in the leach reactors is generally maintained above 1 to 1 and preferably above 1.2 to 1 to provide high oxidation/reduction potential for optimum leaching. This ratio provides a ferric sulfate consumption to copper dissolution ratio just above stoicheometric and the consumption ratio can be varied by controlling the leaching parameters. Also within the embodiment of the present invention where ferrous oxidation in solution is conducted separately from the ore being leached, the oxygen consumption to ferric sulfate regeneration ratio is near stoichiometric, an important consideration since oxygen has to be generated on site.

In general, it is appropriate to control leach solution chemistry to provide an optimum oxidation/reduction potential while promoting formation of elemental sulfur from covellite leaching and minimizing the dissolution of iron pyrite; these reactions should only proceed to the point of maintaining a leach solution chemical balance in iron and sulfuric acid.

The solvent extraction of the PLS solutions obtained from leaching stages (d) or (e) and (f) allows a very efficient SX operation. It is usually carried out at a PLS solution temperature of 40 to 45° C. with minimum or no crud formation. A wash stage for the entrained iron removal is normally provided.

The solvent extraction reaction is as follows:

$$CuSO_4 + 2H \rightarrow Cu^+ + H_2SO_4$$

It releases 1.54 g of $H_2SO_4$ per gram of Cu extracted.

Ferric sulfate regeneration of the leach solution in step (g) above, is preferably carried out isolated from the ore being leached, to optimize oxygen utilization and consumption. Ferric regeneration is also preferably performed on the SX raffmate to obtain optimum regeneration efficiency with the necessary acid availability provided by the raffinate. If desired, supplemental ferrous oxidation can also be performed in the ore leach reactors. Ferric iron generation is highly sensitive to solution temperature and pressure. Temperatures above 50° C. and pressures of approximately 100 psi allow efficient oxidation of approximately 80% the iron in solution in a short time period at less than 20 minutes. Oxygen and free sulfuric acid must be present during oxidation. The oxygen used in this process is normally about 94% pure (commercial grade), and the free acid is normally obtained from the raffinate following the solvent extraction stage of the process.

Oxidation of the ferrous iron can be accomplished using a conventional low temperature/low pressure autoclave or the preferred system recommended herein by the applicants. This system utilizes pipe line static mixers followed by pipe line pressure surge reactors. In either case, the ferrous oxidation reaction is preferably conducted while isolated from the leach ore. This allows near stoichiometric oxygen consumption and allows control over the quantity of elemental sulfur or iron pyrites oxidized and leached.

The reaction of ferric sulfate generation is as follows:

$$2\ FeSO_4 + H_2SO_4 + \tfrac{1}{2}O_2 \rightarrow Fe_2(SO_4)_3 + H_2O$$

It requires 0.878 g of $H_2SO_4$ per gram of Fe oxidized.

Finally, the electrowinning of the copper values extracted by solvent extraction is essentially conventional, however, since electrowinning generates a positive heat balance, this process allows heat recovery from the electrowinning for utilization in leaching.

The overall process is operated utilizing heat exchange systems for energy recovery and conservation. A balance of the heat conservation and the exothermic leach reactions provide a leach system nearly balanced.

BRIEF DESCRIPTION OF THE DRAWINGS

The invention will now be described with reference to the appended drawings in which.

DETAILED DESCRIPTION OF THE INVENTION

Figure 1:
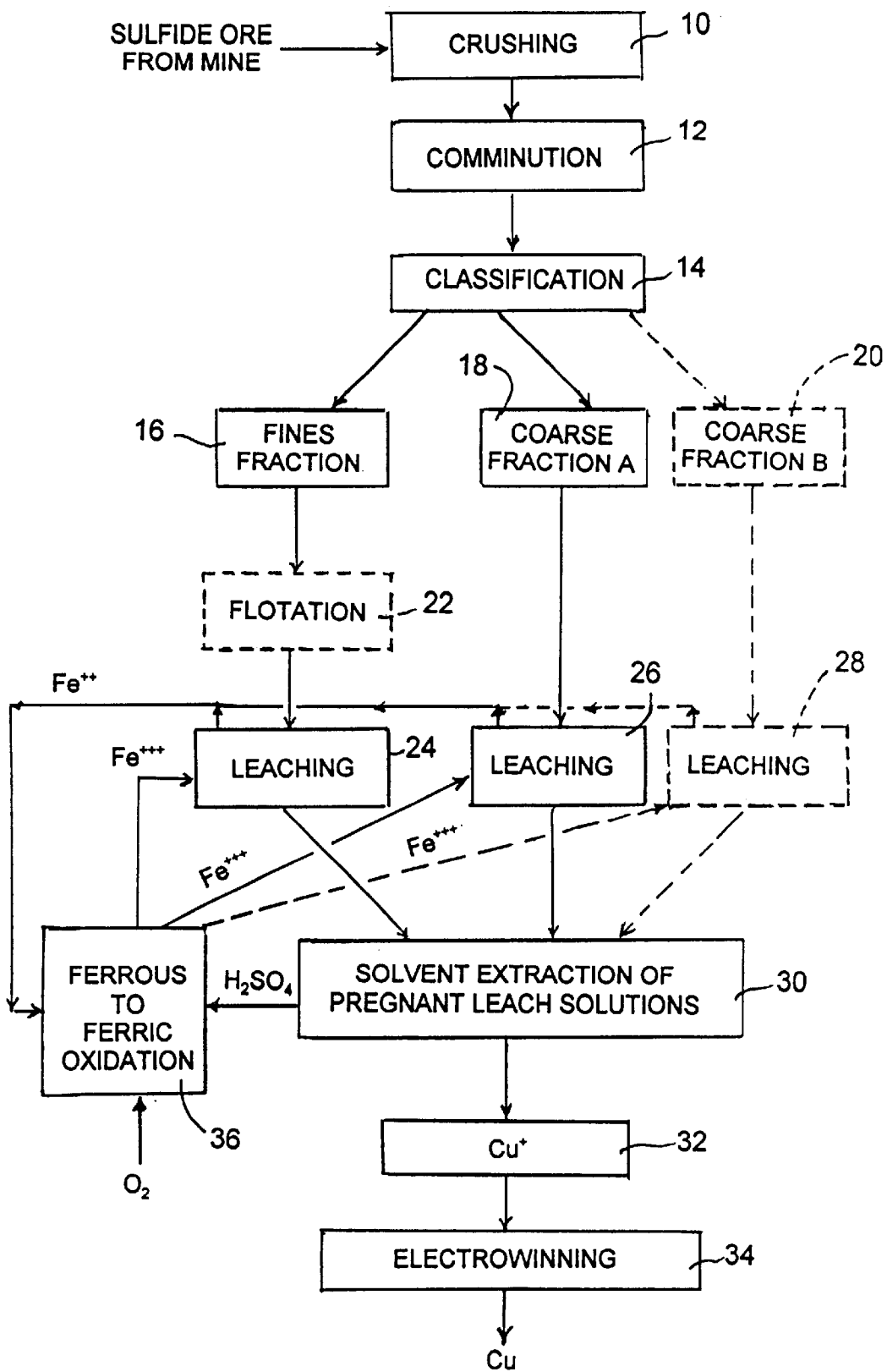
FIG. 1 is a flowsheet showing schematically the preferred embodiment of the process of the present invention.

A preferred, but non-limitative embodiment of the present invention is illustrated in the drawings.

According to FIG. 1, the sulfide ore, such as porphyry ore, is first subjected to a crushing operation 10 where the ore is crushed to a predetermined particle size distribution, for example P-80 of about 1.5 inches (38.1 mm). Thereafter, the crushed ore is subjected to a comminution operation 12 to reduce the ore to a particle size level P-80 of between 4 and 20 mesh (4.76 mm and 0.84 mm). In this regard, the applicants have found that liberation of the sulfide ore to leach solution occurs between about 4 and 20 mesh and that no finer grinding is required. Thereafter, the ground material is classified at 14 into a fines fraction 16 having a particle distribution size P-80 of less than 65 mesh and a coarse fraction 18 of which P-80 is greater than 65 mesh. The coarse fraction can itself be classified into several fractions, for instance into coarse fraction A shown at 18 and coarse fraction B shown at 20 in dotted lines since it is a preferential, but nonessential feature. For example, fraction A could have a size distribution P-80 of between 24 mesh to 65 mesh and fraction B of between ¼ inch to 24 mesh (6.3 mm to 0.71 mm).

Once the proper classification 14 has been accomplished, the fines 16 are subjected to ferric sulfate leaching 24, or preferably to flotation 22 (shown in dotted lines as being preferential) to form a concentrate which is then subjected to ferric sulfate leaching 24 carried out at atmospheric pressure and an elevated temperature of e.g. 70° C. The leaching operation 24 is normally carried out in co-current leach tank reactors for a period of about 8–16 hours to provide a recovery of 85 to 95% and generate a PLS suitable for solvent extraction. In parallel, the coarse fraction 18 and potentially the coarse fraction 20, are directly subjected to leaching operations 26 and potentially 28 also with ferric sulfate lixiviant and also at atmospheric pressure and elevated temperature of, e.g. 70° C. This leaching is carried out in a leach tank reactor or reactors for a period of about 24–48 hours to form a PLS, and recoveries of 85% to 90% are obtained depending on mineralogy. All leaching operations lead to a high PLS grade of 5 to 15 g/l copper.

The pregnant leach solutions obtained by leaching operations 24, 26 and 28 (if present) are sent to a solvent extraction plant 30. The solvent extraction is essentially conventional, however, due to the clean, high grade PLS produced in accordance with the present invention, it results in a very efficient SX operation leading to a copper solution 32 suitable for electrowinning 34 that produces copper metal. The electrowinning operation generates a positive heat balance and thus heat may be recovered and used, for example, for the leaching stages 24, 26 and potentially 28.

The solvent extraction of copper ions in operation 30 results in the generation of free sulfuric acid which is then available to be used in the ferrous to ferric sulfate oxidation 36 which step is acid consuming. The ferric sulfate is then recycled back to the leaching stages 24, 26 and potentially 28.

Figure 2:
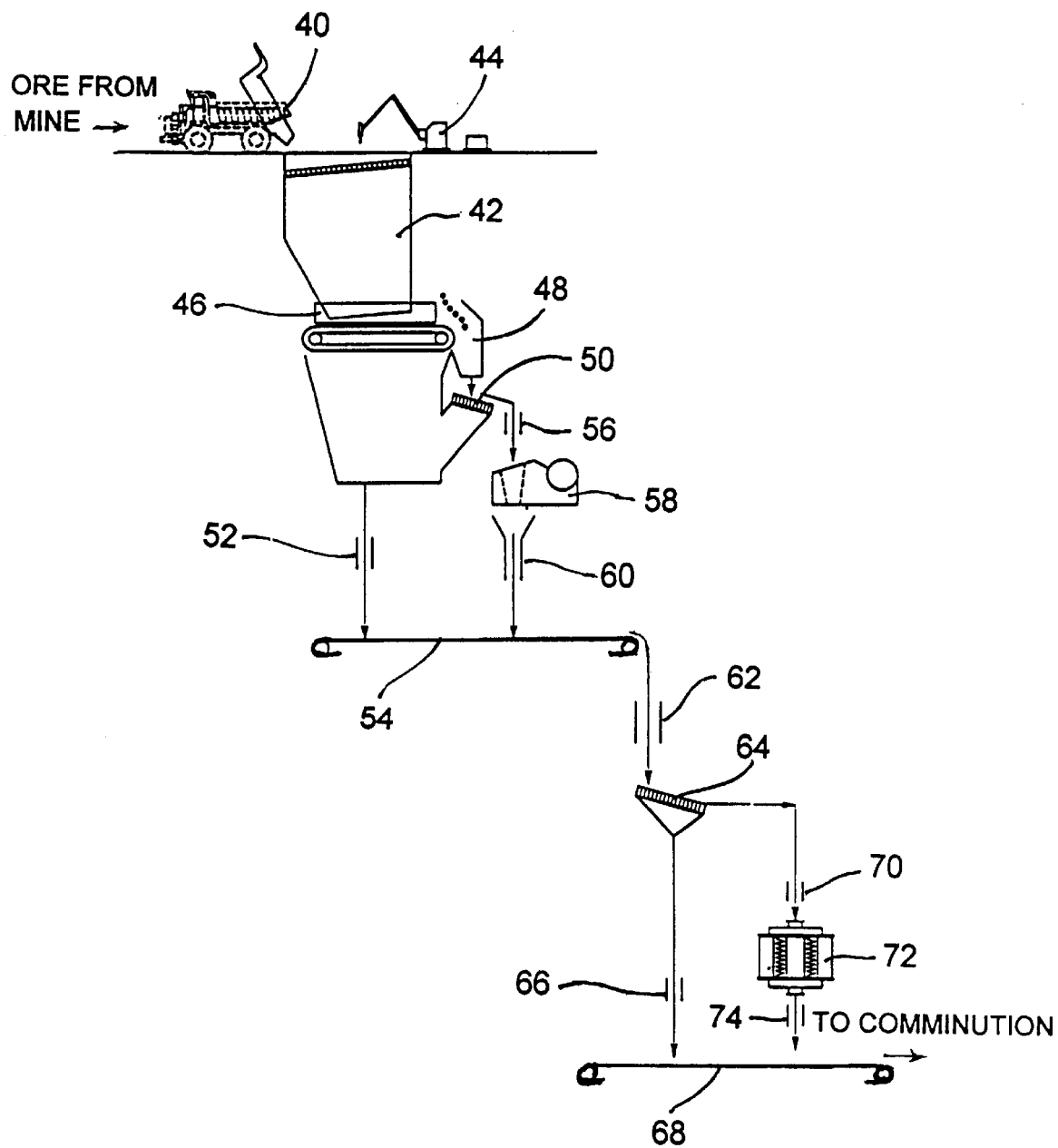
FIG. 2 diagrammatically illustrates the initial crushing of the ore.

FIG. 2 illustrates in detail the crushing operation performed in accordance with the present invention. The ore from the mine may be transported by trucks 40 and dumped into a crusher hopper 42. A hydraulic rock breaker 44 is provided to break rocks which are too large. An apron feeder 46 feeds the rocks through chute 48 to a vibrating grizzly 50 that separates the natural fines from larger rocks and the fines fall through chute 52 onto conveyor 54 while larger rocks fall through chute 56 into a jaw crusher 58 where a preliminary crushing takes place. From here, the crushed rock falls through chute 60 onto conveyor 54 by which the materials are directed through chute 62 to another vibrating grizzly 64 which separates again the fines that fall through chute 66 onto conveyor 68 and larger rock which falls through chute 70 into a cone crusher 72 where the rock is crushed to a desired size, for example P-80 of 1.5 inches (31.8 mm). The so crushed material then falls through chute 74 onto conveyor 68 by which it is directed to the comminuting operation. The crusher/screening equipment design selection can be varied depending on the ore tonnage and ore feed material.

Figure 3:
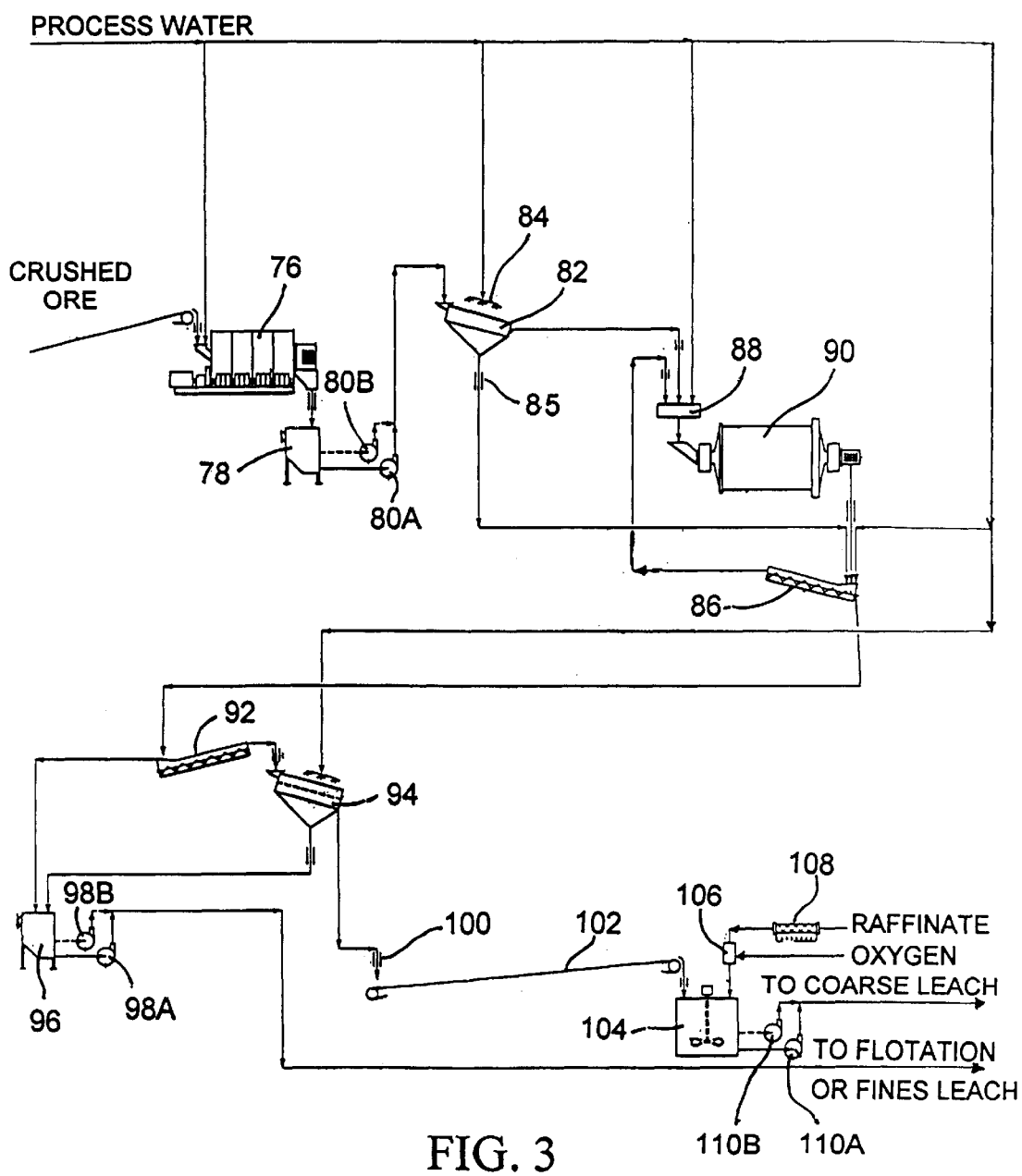
FIG. 3 diagrammatically illustrates the grinding of the ore.

The comminution and classification operations are illustrated in detail in FIG. 3 where the crushed ore from the crushing stage, illustrated in FIG. 2, is combined with process water and charged into a drum scrubber 76 for generation of a slurry. The slurry is then charged to a pump box 78 from which it is pumped by screen feed pumps 80A and 80B to a feed screen 82 where it is screened with the assistance of sprays 84 of process water. The coarse material is thus separated from the fines by wet screening. The fines are then directed via chute 85 to a spiral classifier 86, while the oversized material is directed to a collection bin 88 together with process water and a recycle from the classifier 86, and charged to a rod mill 90 where grinding to a desired particle size is effected.

In summary, the crushed ore is subjected to a wet scrubber to remove, as a slurry, essentially all natural fines incoming with the ore and the fines generated in the crushing. The fines from the scrubber are removed, for example, at –10 mesh (1.68 mm) and the coarse ore between 10 and 1.5 inches (38.1 mm) is then fed to the grinding mill such as rod mill 90, which by design generates the least quantity of fines during comminution. The rod mill essentially reduces the coarse ore to a size mostly between 10 and 65 mesh (1.68 mm and 0.21 mm).

Figure 4:
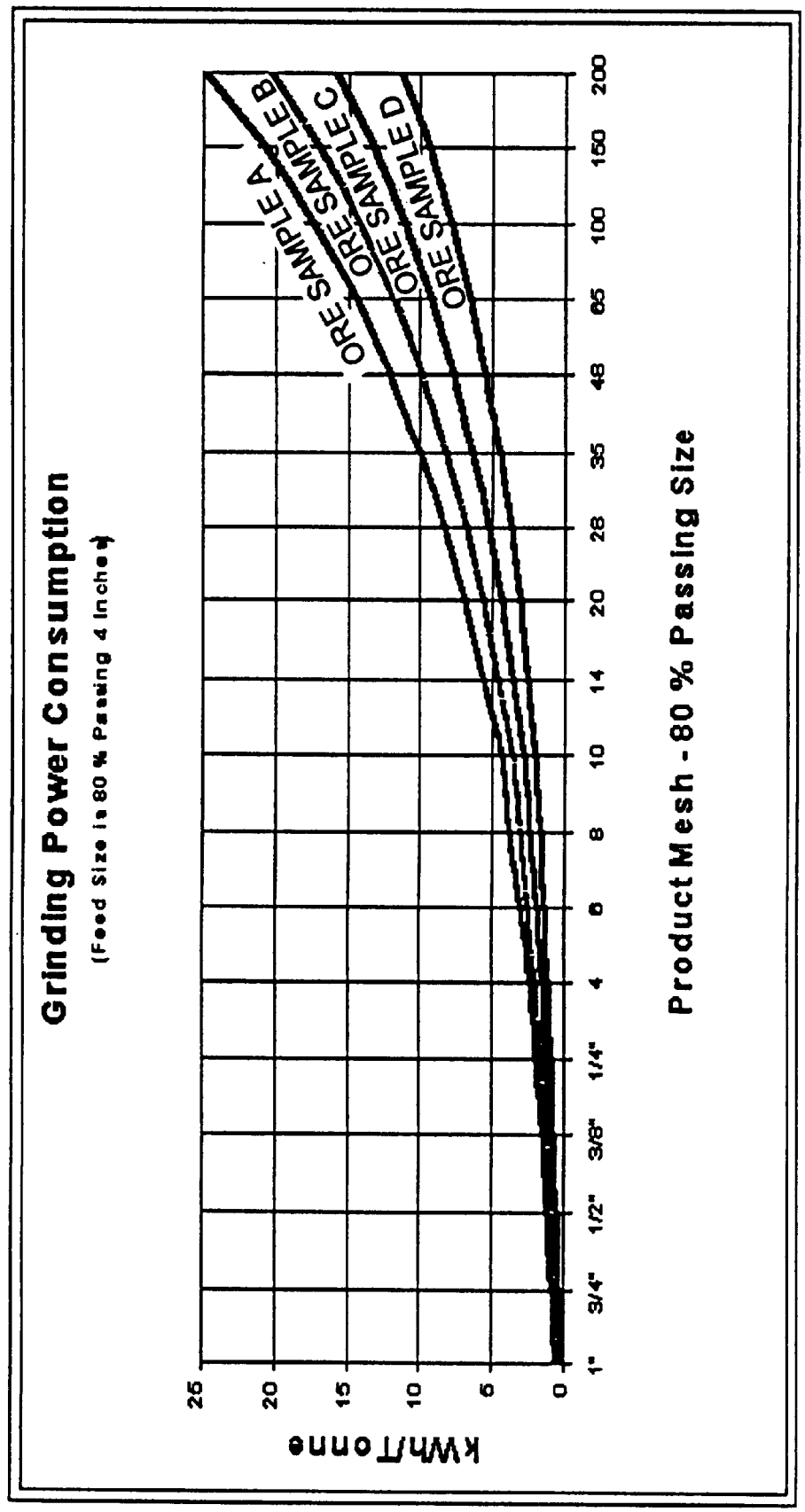
FIG. 4 shows a graph of the requirement in KWH for grinding four types of sulfide ore to a given particle size.

Thus, contrary to prior art suggestions of grinding the ore to the fineness of 20 microns or less, this preferred embodiment uses a rod mill 90, rather than a ball mill, to produce the smallest possible amount of fines, which are herein defined as P-80 of –65 mesh (0.21 mm). The overall quantity of such fines produced during the crushing and comminution operations to a P-80 of 10 mesh will normally not exceed 25%–30% by weight of the total ore, the remainder being +65 mesh. Thus, grinding in the rod mill 90 will be controlled to achieve a P-80 of between 4 and 20 mesh. This is done because, as is shown in FIG. 4, the grinding energy in KWH per tonne to achieve a particle size smaller than 20 mesh increases significantly, which would make the operation uneconomical if grinding to a fineness of 20 microns or less were performed. As shown in FIG. 4, four samples of sulfide ores with different Bond Work Indices were ground to different particle sizes starting from P-80 of 4 inches (101.6 mm) to a P-80 of 200 mesh (0.074 mm). The power consumption in KWH per tonne required for grinding to a particle size P-80 of less than 20 mesh increases significantly for each sample. In FIG. 4, the Bond Work Indices of the ore samples were as follows: Ore Sample A=22; Ore Sample B=18Ore Sample C=14; and Ore Sample D=10. Thus, the grinding operation in accordance with the present invention provides substantial advantages over the prior art systems that require multi-stage crushing to –¼ inch or grinding to a few microns fineness. The present invention allows ore size reduction, for example to a P-80 of 10 mesh less expensively than a conventional three-stage crusher which reduces ore to –⅜ inch and far less expensively than grinding to a few microns.

Upon grinding in the rod mill 90, as shown in FIG. 3 and discussed above, the ground material is classified in the spiral classifier 86 together with the fines from feed screen 82. The oversized particles are recycled to the collection box 88 to be re-ground, while the particles of accepted particle size are re-classified in a spiral classifier 92. The coarse fraction is then wet-screened by screen 94 to separate any fines remaining in the coarse material and to dewater the coarse fraction prior to changing it into the coarse leach circuit. The fines from the spiral classifier 92 and the screen 94 are sent to a pump box 96 and then pumped by pumps 98A and 98B to advance to the flotation circuits or, if the fines are not readily floatable, to a fines leach circuit. The coarse materials are dumped through chute 100 onto belt conveyor 102 and then into an agitated re-pulp tank 104 in which they are re-pulped with a raffinate ferric sulfate solution from a ferric generator 106 in which a raffmate preheated by heater 108 to a temperature of about 70° C. and oxygen are supplied to produce the ferric sulfate. From the re-pulp tank 104 the material is pumped by pumps 110A and 110B to the coarse leach stage. Although spiral classifiers are preferred by the applicants, other classification equipment can also be used, such as screens and cyclones.

Figure 5:
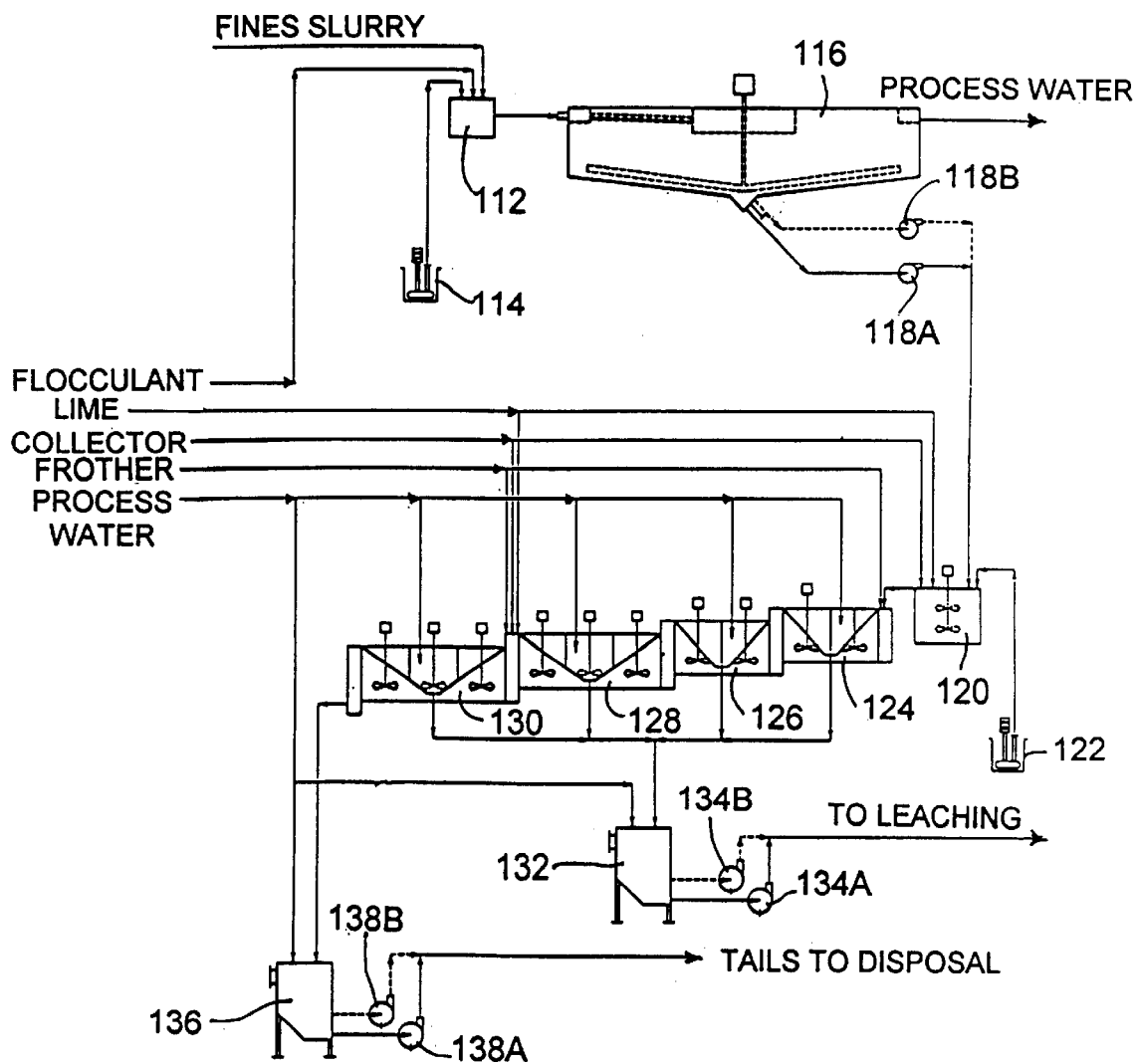
FIG. 5 diagrammatically illustrates the flotation operation of the fines.

FIG. 5 illustrates in detail the fines flotation operation when used in accordance with the present invention. The fines slurry from the pump box 96 (shown in FIG. 3) are pumped to the thickener feed collection box 112 together with a flocculaet and the discharge from the thickener sump pump 114. The feed from the box 96 is charged to the flotation thickener 116 where the fines slurry is thickened from about 30% solids to 50–60% solids to allow flotation product surge/storage and a constant feed of flotation. The thickened slurry is then discharged by pumps 118A and 118B to the conditioner tank 120 where conditioning with lime and a collector is carried out. The discharge from the rougher flotation sump pump 122 may also be added to the conditioner tank 120. From the conditioner tank 120, the slurry is fed to a bank of rougher flotation cells 124, 126, 128, 130 to which the various reagents such as lime, collector, frother and process water are added as required to control the desired percent solids. The rougher concentrate then proceeds to the pump box 132 with addition of some process water and is thereafter pumped, following filtration for dewatering (not shown), to the leaching stage by pumps 134A and 134B. Filtration dewatering can be performed in a vacuum drum, a vacuum belt or various plate and frame filters, depending on ore tonnage rates. The tails are sent to a pump box 136 and then pumped by pump 138A and 138B to a conventional tailings dam for disposal. The rougher flotation circuit is operated in a manner to optimize recovery rather than concentrate grade, and recovery is usually above 95%. However, depending on the type of the ore and mineralogy, a cleaner flotation stage may also be appropriate.

Figure 6:
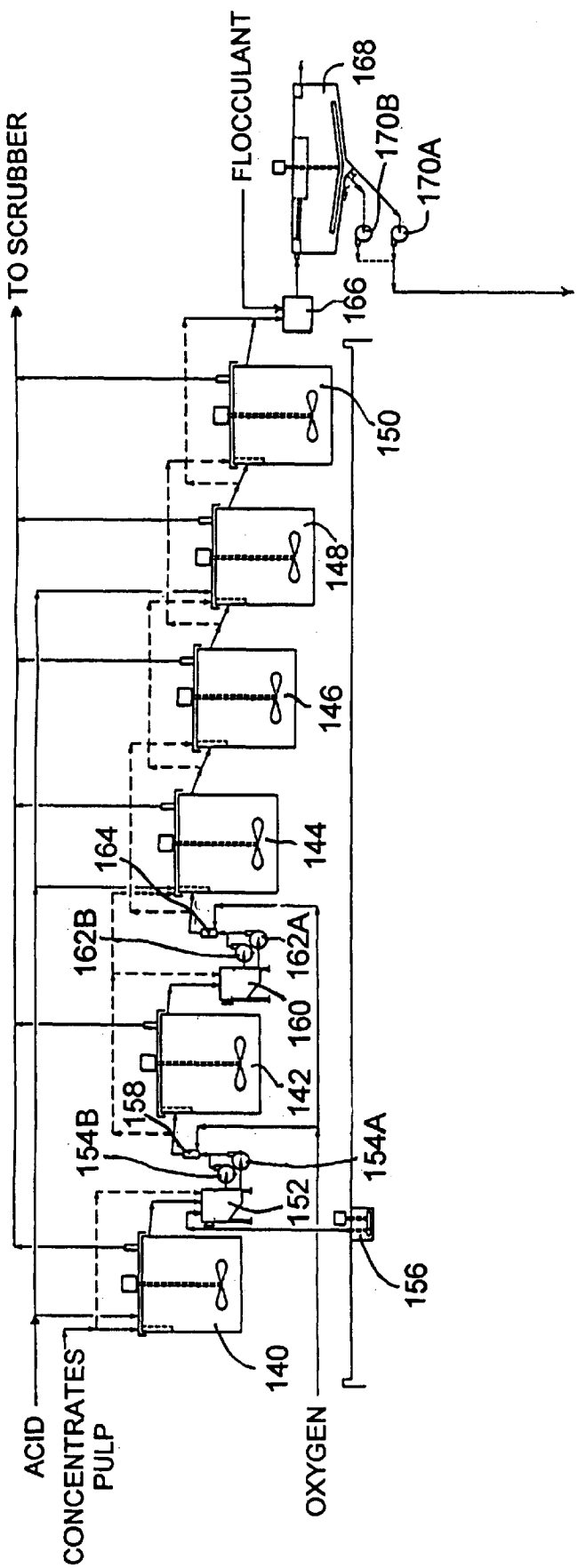
FIG. 6 diagrammatically illustrates the fines leaching operation to the thickener stage.

As illustrated in FIG. 6, the concentrates produced from the flotation of the fines are re-pulped to approximately 10% solids and leached in co-current atmospheric leach tanks 140, 142, 144, 146, 148 and 150, which are normally insulated to maintain optimum heat balance. The leaching is carried out at elevated temperature, e.g. 70° C., for a period of 8–12 hours. A pump box 152 is provided between reactors 140 and 142 to which the leach solution from reactors 140 and 142 together with the partially leached concentrate pulp and discharge from the leach area sump pump 156 are added. This slurry is then pumped by pumps 154A, 154B through a ferric generator 158 to which oxygen is injected to oxidize ferrous to ferric ions. Up to 75% of the copper is leached in reactors 140 and 142 and thus the ability of ferric regeneration is supplied to these reactors to maintain optimum leach conditions in the remaining reactors. The resulting slurry then goes to pump box 160 from which it is pumped by pumps 162A, 162B through a ferric generator 164 and is leached successively in tanks 144, 146, 148 and 150 and the leached slurry is then advanced into the thickener feed collection box 166 together with some flocculant, if required, from which it is charged to a thickener 168 to thicken the leach tails. The thickener underflow solids are pumped out from the thickener 168 by pumps 170A, 170B.

Figure 7:
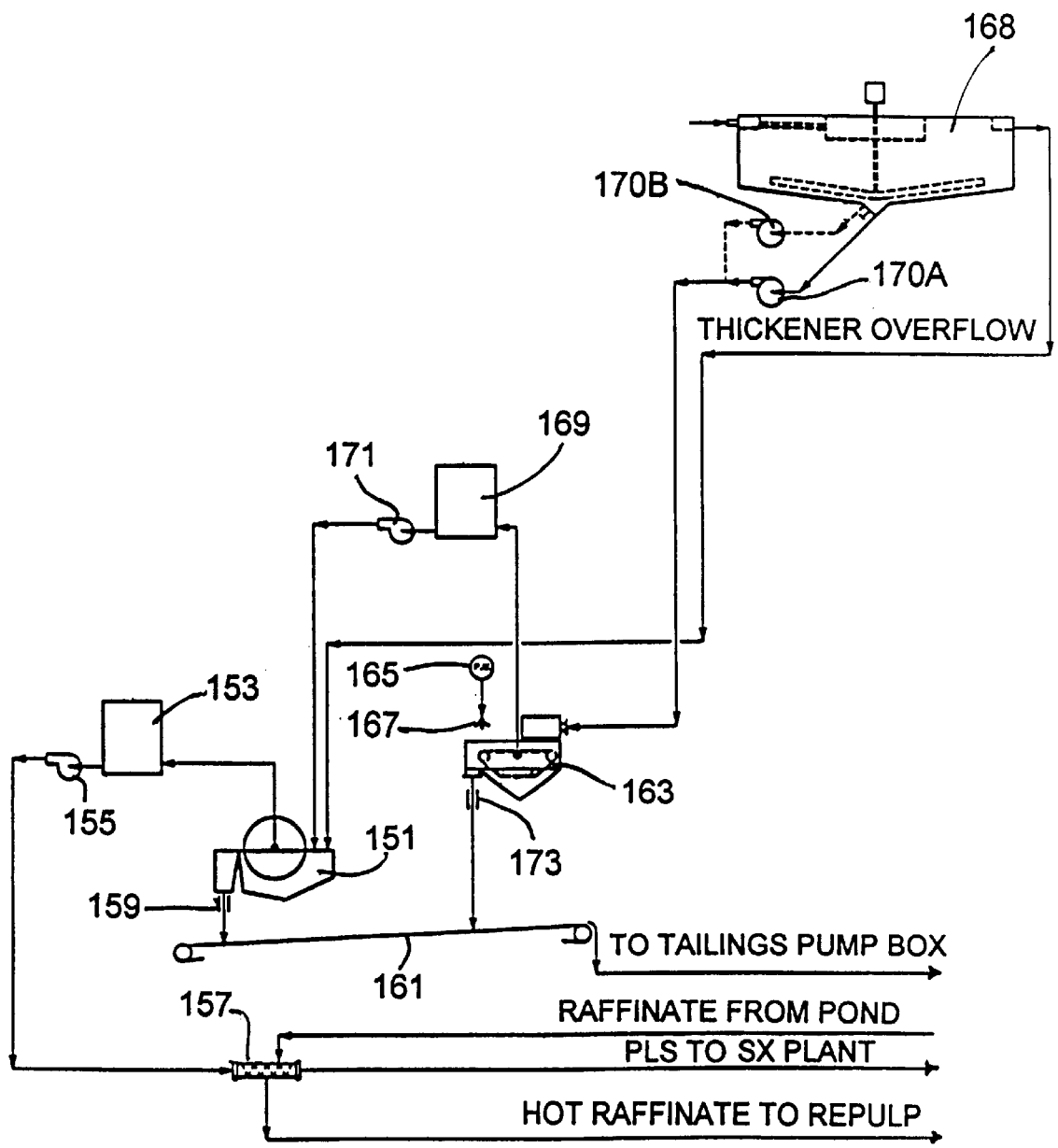
FIG. 7 diagrammatically illustrates the treatment of the thickener overflow and thickener underflow from the operation of FIG. 6.

As illustrated in FIG. 7, the overflow from the thickener 168, which contains much of the −5 micron material, is filtered and washed in a vacuum precoat drum knife filter 151 from which the filtrate is forwarded to a filtrate receiver 153 from which it is pumped by pump 155 through heat exchanger 157 as a PLS to the solvent extraction plant. The tailings from filter 151 are conveyed via chute 159 and conveyor 161 to the tailings pump box (not shown).

The thickener underflow solids, containing a minimum amount of −5 micron particles, are pumped out of the thickener 168 by pumps 170A and 170B for filtering on a vacuum belt filter 163 and washing by a fresh water supply 165 sprayed by spray bars 167. The filtrate from belt filter 163 is forwarded to filtrate receiver 169 from which it is pumped by pump 171 to the vacuum knife filter 151 for polishing clarification so that a single clarified PLS is sent to the solvent extraction. The tailings from the belt filter 163 are conveyed via chute 173 onto the conveyor 161 and then to the tailings pump box (not shown).

A determination may also be made as to whether precious metal recovery from the filter tailings is justifiable. The copper recovery by this leach operation is normally 85% to 95%, depending on mineralogy.

Figure 8:
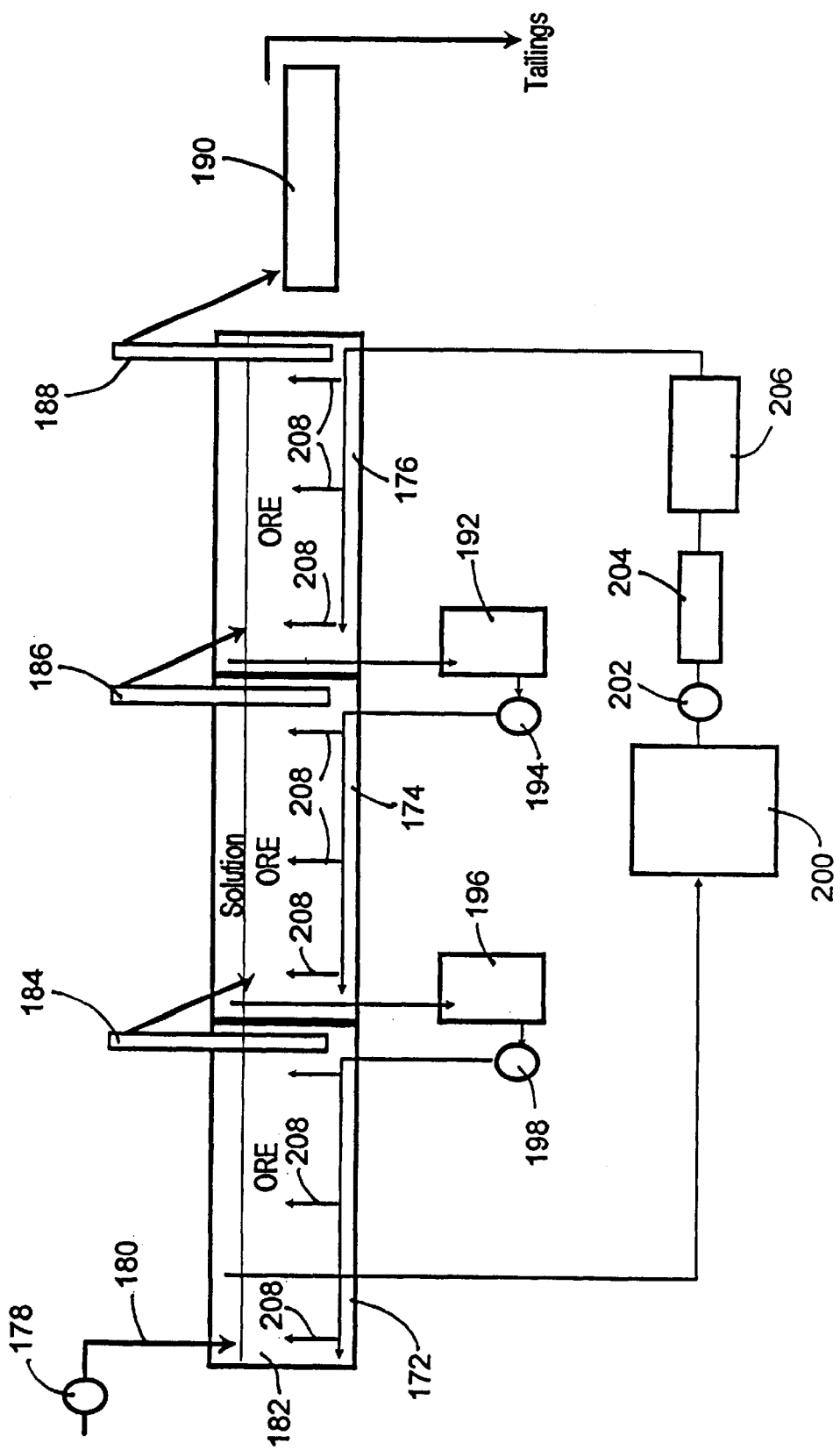
FIG. 8 diagrammatically illustrates the coarse fraction leaching operation.

FIG. 8 illustrates the preferred treatment of the coarse fraction in leach reactors 172, 174 and 176 using a multi-stage continuous countercurrent ore/solution flow system. The coarse ore from the spiral classifier 92 (FIG. 3) may be dewatered on a double or triple deck screens 94 which would allow segregation of the coarse particles, for example ¼ inch to 65 mesh into several leach fractions. This would allow different leach times and a different leach reactor sizes for each leach fraction while facilitating and optimizing the movement of ore through the reactors due to smaller differences between the size distributions of each of the different leach fractions.

The coarse ore is pumped as a slurry by pump 178 and fed into the first leach reactor 172 from above. By controlling the leach solution flow rate per square foot of reactor area in line 180 feeding the reactor 172, the ore bed 182 is lifted and/or completely fluidized, if desired, periodically or continuously, to allow the ore to slowly move from the point of charging into the reactor 172 to the opposite end of the reactor 172 where de-watering augers 184 remove the ore and advance it to the next reactor 174 in series, and then augers 186 advance it to the next reactor 176 in series. The number of reactors in series can vary to minimize short circuiting through the reactors and the method of ore removal can vary as well. For example, in lieu of augers, hydraulic classifiers, screens, cyclones, etc. can be used, but all with the purpose of moving the ore from reactor to reactor in series. After the ore passes through leach reactors 172, 174 and 176 (or more if desired), the leached tailings are fed by auger 188 to a vacuum belt filter 190 where the tailings are dewatered and washed with fresh water, both to recover copper in solution and to discharge clean washed tailings. Partial heat recovery may also be accomplished by filtration and water washing. The solution from reactor 176 overflows to a solution tank 192 from which it is pumped by pump 194 into the ore bed of reactor 174 from below. In the same fashion, the solution from reactor 174 goes to a solution tank 196 from which it is pumped back by pump 198 into the ore bed of reactor 172 again from below. The PLS solution from reactor 172 is conveyed to the solvent extraction plant 200. The raffinate from solvent extraction plant 200 is pumped by pump 202 to a heat exchanger 204 where the solution is heated to the desired temperature, and then into a ferric generator 206 for regeneration of ferric sulfate and into the bottom of the last leach reactor in series 176. The solution distribution into the reactor is done by means of distribution pipes 208. Typically, multiple headers of such pipes are located in each reactor. Within the leach reactor 172, the solution is pumped by upward percolation through the ore and is collected at the top of reactor 172. As already mentioned above, the solution from reactor 176 overflows the top of the reactor and into a solution storage/surge tank 192 from which it is pumped countercurrent to the ore flow into reactor 174. Again the flow is distributed through multiple headers 208 identical to those of reactor 176 and proceeds by upward percolation through the ore. The solution overflows reactor 174 into a storage/surge tank 196 and is pumped by upward percolation through reactor 172 through a multiple system 208 identical to reactor 176. The PLS solution overflows reactor 172 to a PLS storage tank (not shown), through filters if necessary, and is fed into the solvent extraction plant 200. The leach solution flow rate can be varied to allow ore bed movement with either a continuous flow rate or with intermittent accelerated flow rates. Flows can also be varied based on the leach size fraction being treated in a particular series of reactors. The configuration of the leach reactors can be rectangular, square or round tanks, as desired for ease of construction. Heating of the raffmate is accomplished by external heat addition in heat exchanger 204 and by exothermic heat generated in the ferric generator 206, before being returned to the leach reactors.

This flowsheet of FIG. 8 allows a continuous countercurrent leach reactor system which permits optimum control and use of particle size, temperature, ferric concentration and oxidation/reduction potential in the leach reactors while allowing a reduced ferric iron concentration to solvent extraction and, thereafter, optimum conditions for ferric oxidation in the ferric generator 206. If desired, oxygen can also be injected between reactors for supplemental ferric generation.

The leaching of the coarse fraction or fractions is carried out at an elevated temperature, preferably of approximately 70° C., yielding recoveries of 85–95% depending on mineralogy. A low total leach flowrate allows a high PLS grade (5–15 g/l). The leach reactors 172, 174 and 176 are preferably insulated to provide heat conservation. The ferric generator 206 (and this applies to ferric generators used elsewhere in this process) operates at a preferred temperature of about 70° C. and a pressure of about 100 psi. Oxygen used for ferrous to ferric oxidation is commercial grade of ±94% and the free acid required for the ferrous/ferric oxidation reaction is supplied from the SX operation. Some of the ferrous to ferric oxidation may occur in the leach reactors if desired, which allows control over the degree of sulfur and pyrite dissolution and acid generation.

The operating variables of particle size, temperature, ferric concentration and acid concentration are easily controllable and each variable provides a large degree of operating control over the process. It should also be noted that in lieu of the multi-stage continuous system illustrated in FIG. 8 and described above, it would be possible to leach the coarse fraction on a batch basis, for instance in a single tank or several tanks used in parallel.

The solvent extraction of the PLS is carried out essentially in a conventional manner, but at a low total flow rate due to the elevated PLS copper concentration and normally operates at about 40 to 45° C. There is, therefore, minimal or no crud formation, low entrainment due to rapid and clean phase separation and the overall SX operation is very efficient. The solvent extraction chemical reactions produce free sulfuric acid in the raffinate, which can be re-used in the ferrous to ferric oxidation reaction. The copper strip solution produced by SX is then subjected to electrowinning which is conventional in the industry. However, since electrowinning generates a positive heat balance, and the leach circuit is operated at an elevated temperature, heat may be recovered therefrom with this technology and returned to leaching.

This novel method of copper recovery from copper ore, such as sulfide minerals, provides many advantages over prior art methods, namely: (1) high recoveries are achieved with rapid kinetics; (2) no reliance on bacteria for ferric generation; (3) the system is insensitive to secondary sulfide mineralogy and partially leaches chalcopyrite; (4) the system is self sufficient in iron and acid (5) the water balance presents no problem; (6) the heat balance presents no problem; (7) low capital and operating costs compared to prior art systems; (8) a dynamic and simple operating control is used; (9) produces a low solution copper inventory; (10) a low copper inventory resides in the pipeline; and (11) the method is environmentally superior to presently known technologies.

It should be mentioned that the invention is not limited to the specific embodiment described above, but that various modifications obvious to those skilled in the art can be made without departing from the spirit of this invention and the scope of the following claims.

What is claimed:

1. Process for recovery of copper values from a copper ore, which comprises;
    (a) crushing the copper ore to a predetermined particle size greater than ½ inch;
    (b) comminuting the crushed ore to a particle size sufficient to allow leach solution mineral liberation;
    (c) classifying the ground ore into a fines fraction and at least one coarse fraction;
    (d) leaching the fines fraction with a ferric sulfate lixiviant at atmospheric pressure and a temperature between 50° C. and 80° C., so as to form a pregnant copper leach solution, while ferric iron is reduced to ferrous iron thereby forming ferrous sulfate;
    (e) in parallel to the leaching of the fines fraction, leaching the coarse fraction or fractions with ferric sulfate lixiviant at atmospheric pressure and a temperature between about 50° C. and 80° C., so as to form a pregnant copper leach solution while ferric iron is reduced to ferrous iron thereby forming ferrous sulfate;
    (f) extracting copper values from the pregnant leach solutions of steps (d) and (e) by solvent extraction, while producing free sulfuric acid;
    (g) oxidizing the ferrous sulfate produced in steps (d) and (e) to ferric sulfate using free sulfuric acid from step (f) and oxygen, and reusing the ferric sulfate thereby produced in the leaching operations of steps (d) and (e).

2. Process according to claim 1, wherein the copper ore is a sulfide ore that includes secondary sulfides.

3. Process according to claim 2, wherein the secondary sulfides include chalcocite and covellite.

4. Process according to claim 3, wherein leach solution chemistry of the leaching operations is controlled to provide an optimum oxidation/reduction potential while promoting formation of elemental sulfur from covellite leaching and minimizing dissolution of iron pyrite, so as to maintain a leach solution chemical balance in iron and sulfuric acid.

5. Process according to claim 1, in which the crushing is carried out to a particle size P-80 of between 1 and 2 inches.

6. Process according to claim 1, wherein the crushed ore is comminuted to a Tyler mesh P-80 size of between 4 and 20 mesh.

7. Process according to claim 1, wherein the comminuted ore is classified into a fines fraction having a Tyler mesh particle size P-80 less than about 65 mesh and at least one coarse fraction having a Tyler mesh particle size P-80 greater than about 65 mesh.

8. Process according to claim 7, wherein the coarse fraction is classified into at least two fractions of coarse ore of different particle size distribution.

9. Process according to claim 1, wherein prior to leaching the fines fraction is subjected to flotation to produce a concentrate, whereby the fines fraction leached in step (d) is in the form of said concentrate.

10. Process according to claim 9, wherein the fines fraction is subjected to flotation in a bank of rougher cells optimized to obtain recoveries above 95%.

11. Process according to claim 9, wherein the fines fraction is first formed into a slurry and the slurry of the fines is thickened prior to the flotation.

12. Process according to claim 9, wherein the leaching of the concentrate resulting from the fines flotation is carried out with a ferric sulfate concentration of between 5 and 30 g/l, at a temperature of between about 60° C. and 70° C. for a period of 8 to 16 hours, leading to a copper recovery of between 85% and 95%.

13. Process according to claim 12, wherein the leaching is carried out in insulated co-current leach tank reactors.

14. Process according to claim 1, wherein the leaching of the coarse fraction or fractions is carried out with a ferric sulfate concentration of between 5 and 30 g/l, at a temperature of between about 60° C. and 70° C. for a period of 24 to 48 hours, leading to a copper recovery of between 85% and 95%.

15. Process according to claim 14, wherein the leaching of the coarse fraction or fractions is carried out in a multi-stage continuous counter-current reactor.

16. Process according to claim 14, wherein the leaching of the coarse fraction or fractions is carried out as a batch operation in a separate leach tank for each fraction.

17. Process according to claim 1, wherein the ferrous sulfate produced during the leaching operations is oxidized to ferric sulfate in a separate regeneration reactor using oxygen and the free sulfuric acid produced during the solvent extraction operation, the oxidation being carried out at a temperature between 50 and 80° C. and a pressure between 3 and 10 atmospheres.

18. Process according to claim 1, wherein the crushing and comminution operations are carried out while minimizing formation of fines.

19. Process according to claim 1, wherein the copper values extracted by solvent extraction are subjected to electrowinning to produce copper metal.

* * * * *